(12) United States Patent
Holm et al.

(10) Patent No.: US 6,762,880 B2
(45) Date of Patent: Jul. 13, 2004

(54) GRATING STRUCTURES AND METHODS OF MAKING THE GRATING STRUCTURES

(75) Inventors: Johan Christer Holm, Copenhagen (DK); Henrik Madsen, Farum (DK); Steen Weichel, Frederiksberg (DK); Per Eld Ibsen, Copenhagen (DK); Bjarke Rose, Allerod (DK)

(73) Assignee: Ibsen Photonics A/S, Farum (DK)

( * ) Notice: Subject to any disclaimer, the term of this patent is extended or adjusted under 35 U.S.C. 154(b) by 19 days.

(21) Appl. No.: 09/789,888

(22) Filed: Feb. 21, 2001

(65) Prior Publication Data

US 2002/0135876 A1 Sep. 26, 2002

(51) Int. Cl.[7] .............................................. G02B 27/44
(52) U.S. Cl. .................... 359/566; 359/569; 359/576; 430/325
(58) Field of Search ................. 359/566, 569, 359/576; 283/902; 430/325

(56) References Cited

U.S. PATENT DOCUMENTS

| | | | |
|---|---|---|---|
| 4,102,576 A | | 7/1978 | Maeda et al. |
| 4,153,330 A | | 5/1979 | Tomlinson, III |
| 4,251,137 A | | 2/1981 | Knop et al. |
| 4,279,464 A | | 7/1981 | Colombini |
| 4,484,797 A | * | 11/1984 | Knop et al. ............ 283/902 |
| 4,715,027 A | | 12/1987 | Mahapatra et al. |
| 4,740,951 A | | 4/1988 | Lizet et al. |
| 4,773,063 A | | 9/1988 | Hunsperger et al. |
| 4,786,133 A | | 11/1988 | Gidon et al. |
| 4,852,079 A | | 7/1989 | Kinney et al. |
| 5,013,141 A | | 5/1991 | Sakata |
| 5,355,237 A | | 10/1994 | Lang et al. |
| 5,526,155 A | | 6/1996 | Knox et al. |
| 5,639,300 A | | 6/1997 | Smith et al. |
| 5,680,236 A | | 10/1997 | Van Der Tol |
| 5,745,616 A | | 4/1998 | Zirngibl |
| 5,786,916 A | | 7/1998 | Okayama et al. |
| 5,793,912 A | | 8/1998 | Boord et al. |
| 5,796,479 A | | 8/1998 | Derickson et al. |
| 5,799,118 A | | 8/1998 | Ogusu et al. |
| 5,808,763 A | | 9/1998 | Duck et al. |
| 5,852,505 A | | 12/1998 | Li |
| 5,999,672 A | | 12/1999 | Hunter et al. |
| 6,093,520 A | * | 7/2000 | Vladimirsky et al. ....... 430/325 |
| 6,167,112 A | * | 12/2000 | Schneider ................ 378/43 |
| 2003/0076594 A1 | * | 4/2003 | Kramer ................ 359/569 |

FOREIGN PATENT DOCUMENTS

| | | |
|---|---|---|
| EP | 0 254 453 A2 | 1/1988 |
| EP | 0 859 249 A1 | 8/1998 |
| EP | 0 895 100 A2 | 2/1999 |
| EP | 0 965 864 A2 | 12/1999 |
| WO | WO 98/09396 | 3/1998 |
| WO | WO 00/40935 | 7/2000 |

OTHER PUBLICATIONS

Nguyen et al. "High–efficiency fused–silica transmission gratings", Optics Letters, vol. 22, No. 3, Feb. 1, 1997, pp 142–144.

Margaret B. Stern, "Pattern transfer for diffractive and refractive microoptics", Microelectronic Engineering vol. 34, 1997, pp 299–319.

* cited by examiner

Primary Examiner—Drew A. Dunn
Assistant Examiner—Fayez Assaf
(74) Attorney, Agent, or Firm—Altera Law Group, LLC

(57) ABSTRACT

New grating structures include a bonded transmission grating structure. The grating structure is encapsulated by two pieces that are bonded together. In addition, a new method of making grating structures includes forming wells with an aspect ratio (depth:width) of at least 3:1, 7:1 or greater. Such grating structures can be used to form gratings with high diffraction efficiencies for both TE and TM polarizations of light.

19 Claims, 8 Drawing Sheets

GRATING STRUCTURES AND METHODS OF MAKING THE GRATING STRUCTURES

FIELD OF THE INVENTION

This invention relates to grating structures and methods of making the grating structures. In addition, the invention relates to transmission gratings and methods of making transmission gratings.

BACKGROUND OF THE INVENTION

Gratings and prisms are typical examples of optical elements used to separate light according to wavelength or combine light from different sources into a single beam. There are a wide variety of applications for such optical elements including, for example, applications in optical telecommunications, data communications, and spectroscopic analysis of gases, liquids, and solids. Additional examples are illustrated in PCT Patent Application Publication No. WO 00/40935, incorporated herein by reference. With respect to gratings, there are a number of parameters to consider when designing a grating for a particular application. Grating design parameters include, for example, the material used for the grating, the type of grating (e.g., sinusoidal, triangular, blazed, or square/rectangular well), and the physical dimensions of the grating (e.g., the period of the grating, the depth of the grating, and the duty cycle of square/rectangular well gratings). All of these parameters can influence the amount of light that is diffracted by the grating, the efficiency of diffraction into a particular diffraction order, and the efficiency of diffraction for a particular polarization of light (e.g., transverse electrical (TE) or transverse magnetic (TM) polarizations).

The efficiency of diffraction for a particular condition (e.g., order, polarization, or both) can be defined as the ratio or percentage of the intensity of light diffracted for that condition versus the intensity of light incident on the grating. For example, efficiency of diffraction into a particular order can be defined as the ratio or percentage of the intensity of light diffracted into that order versus the intensity of light incident on the grating. Other measures of diffraction efficiency, such as diffraction efficiency for a particular polarization of light, can be determined using this general definition.

Gratings can be designed for a variety of purposes and to achieve a variety of design and application objectives. In some embodiments, it is desirable to obtain high efficiency of diffraction into a single diffraction order. In some embodiments, it is desirable to obtain similar efficiency for TM and TE polarizations of light. In some embodiments, it is desirable to produce a structure that provides the grating with at least partial protection from contamination and damage. In some embodiments, it is desirable to provide the grating with passive temperature compensation to reduce or eliminate the temperature dependence of the output light of the grating.

SUMMARY OF THE INVENTION

Generally, the present invention relates to grating structures and methods of making the grating structures. One embodiment is a transmission grating. The transmission grating includes a first piece and a second piece. The first piece has a surface defining a grating structure. The second piece is bonded to the surface of the first piece to encapsulate the grating structure.

Another embodiment is a method of making a transmission grating. A grating structure is formed in a surface of a first piece. A second piece is bonded to the surface of the first piece to encapsulate the grating structure. One example of such a method includes treating (e.g., plasma or acid treating) at least one of the surface of the first and second pieces (and preferably a surface of both the first and second pieces) to form reactive groups. These reactive groups can then be used to bond the two pieces together. Optionally, a high temperature anneal is performed after the initial bonding.

Yet another embodiment is a transmission grating that includes a piece having a surface defining a grating structure. The grating structure has multiple wells that have an average aspect ratio (depth:width) of at least 7:1. Deeper wells with aspect ratios of at least 10:1 and 15:1 can be formed. In some instances, such grating structures can provide individual diffraction efficiencies for TE and TM polarized light of at least 85% or 95% or more.

Yet another embodiment is a transmission grating that includes a piece having a surface defining a grating structure. The grating structure provides individual diffraction efficiencies for TE and TM polarized light of at least 90% or more.

Another embodiment is a method of making a transmission grating. A masking layer disposed on a substrate is patterned to expose multiple regions, corresponding to grating lines, of a surface of the substrate. These regions of the substrate are etched to form multiple wells in the substrate. The wells have an average depth:width aspect ratio of at least 3:1 and the average width of the wells at the surface of the substrate is typically no more than 1000 nm. Deeper wells with aspect ratios of at least 7:1, 10:1, and 15:1 can be formed.

Another embodiment is a method of forming a grating structure. A waveguiding layer is formed on a substrate. A portion of the waveguiding layer is removed to form a grating structure that includes multiple wells that are spaced apart and have a substantially uniform period.

Yet another embodiment is a method of forming a grating structure. A first grating structure is formed in a surface of a first piece of dielectric material. A second grating structure is formed in a surface of a second piece of dielectric material so that the first and second grating structures having a substantially similar grating periods. The first piece is disposed over the second piece with the first and second grating structures adjacent. An interference pattern between the first and second grating structures is observed. At least one of the first and second grating structures is moved based on the interference pattern to register the first and second grating structures.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
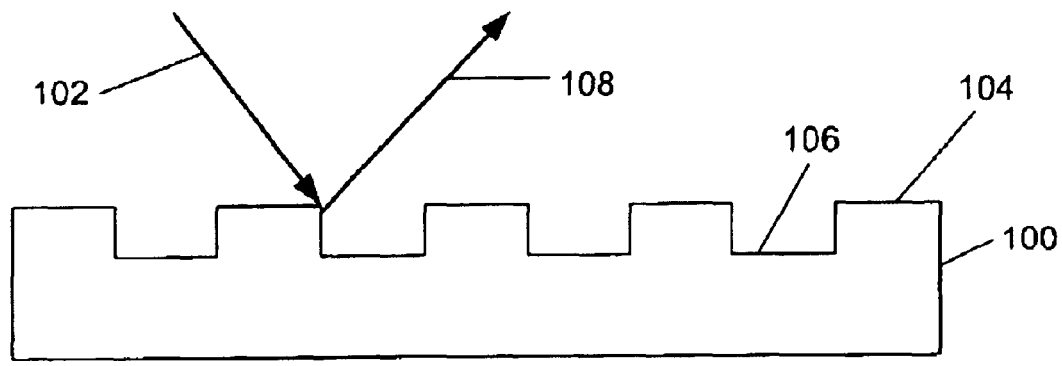
FIG. 1 is a schematic cross-sectional view of a reflective grating, according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to grating structures and methods of making grating structures. In particular, the present invention is directed to transmission gratings and methods of making transmission gratings. While the present invention is not so limited, an appreciation of various aspects of the invention will be gained through a discussion of the examples provided below.

Grating structures typically fall in one of two categories: reflective grating structures and transmission grating structures. Generally, for reflective grating structures 100, as illustrated in FIG. 1, light 102 is incident on a surface 104 that defines a grating structure 106 and is diffractively reflected 108 away from that surface. It will be noted that only a few lines of each of the grating structures are illustrated in each of the Figures for clarity. Typically, the grating structures include at least 100 and often at least 1000 individual grating lines. The number of grating lines per unit width is related to the grating period. For many optical telecommunications applications that utilize light having a wavelength of 1200 to 1600 nm, the period is typically 500 to 1600 nm. This results in about 600 to 2000 grating lines/mm. Other wavelengths of interest for data communications include about 700 to 900 nm.

Figure 2:
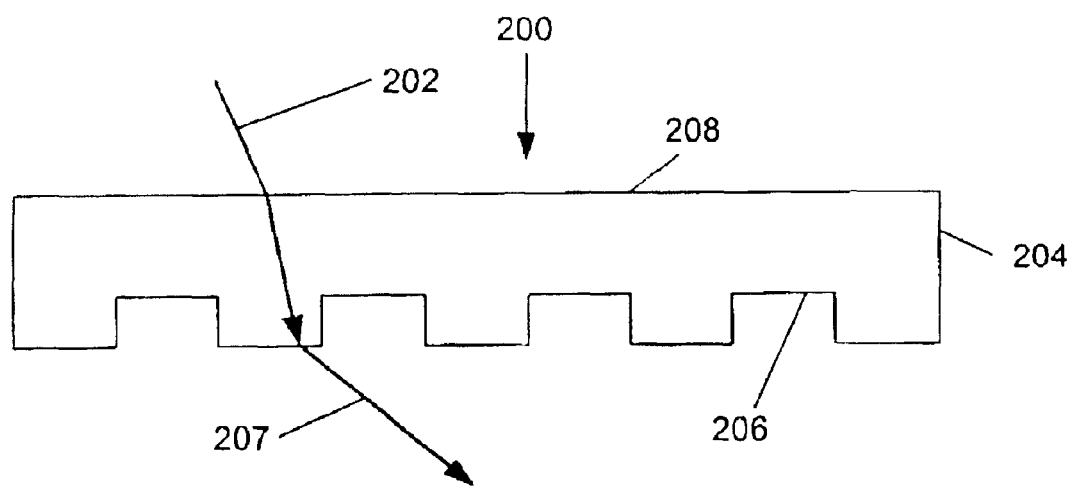
FIG. 2 is a schematic cross-sectional view of one embodiment of a transmission grating; according to the invention.

For transmission gratings 200, as illustrated in FIG. 2, light 202 is incident on a surface (e.g., the non-grated surface). The light travels through at least a portion of the transmission grating and is also diffracted by the grating structure 206. Typically, when diffracted by the grating structure, the light 207 continues to travel away from the light source. It will be understood that light incident on the grated surface will be similarly diffracted away from the light source and transmitted through the grating material. Generally, the following discussion will describe the inventions with respect to transmission gratings. However, it will be recognized that at least some of the disclosure herein also relates to reflective gratings; particularly the methods of grating manufacture, as will be indicated below. Examples of devices and methods illustrating applications of transmission gratings are provided in U.S. patent application Ser. No. 09/790,144, entitled "Wavelength Division Multiplexed Device", filed on even date herewith, and U.S. patent application Ser. No. 09/789,859, entitled "Passive Temperature Compensated Optical Devices and Methods of Manufacture and Use", filed on even date herewith, both of which are incorporated by reference.

The transmission grating 200 generally includes a substrate 204 that defines a grating structure 206. In operation, light 202 is incident on a surface (e.g., the non-grated surface 208) of the substrate 204. The light is both transmitted through at least a portion of the substrate 204 and diffracted by the grating structure 206. It will be understood that light incident on the grated surface will be similarly diffracted away from the light source and transmitted through the substrate. The transmission grating 200 optionally contains an antireflection coating (not shown) on the non-grated surface 208 to reduce reflection at that surface. Typically, any antireflection coating material can be used, although, preferably, the antireflection coating has little or no absorbance in the wavelength region of light to be diffracted by the transmission grating.

Light incident on the transmission grating at an angle, a, from an axis perpendicular to the incident surface (i.e., the grating normal) is typically diffracted from the grating surface according to the diffraction equation:

$$m\lambda = d(n_{out}\sin\beta - n_{in}\sin\alpha) \quad (1)$$

where m is any integer (. . ., −2, −1, 0, 1, 2, . . . ) and represents the diffraction order, λ is the wavelength of the incident light; d is the period of the grating; $n_{in}$ is the refractive index of the medium from which the light enters the transmission grating; $n_{out}$ is the refractive index of the medium into which the light is diffracted (for example, for a transmission grating disposed in air, $n_{in}=n_{out}=1$); and β is the angle from the grating normal at which the light is diffracted. Because the diffraction angle, β, is wavelength-dependent, a polychromatic light beam incident on the transmission grating is separated (e.g., dispersed) according to wavelength. For example, a multiplexed optical communications signal can contain 10, 100, or more signals at different wavelengths of light that are separated by 5, 1, 0.5 nm, or less. The wavelength separation may only be partial if the dispersion by the grating is not sufficient to prevent overlap between the portions of the light beam with close wavelengths. In addition, by proper choice of incident light angle according to equation (1), several monochromatic light beams can be combined into a polychromatic light beam using the transmission grating (i.e., selecting the incident angles, $\alpha_1, \alpha_2, \ldots$, so that $\beta$ is the same or nearly the same for each light beam).

In general, any grating structure can be used. The grating structure is typically periodic; although, in some instances, there is some intentional or unintentional variability in the period. The variability is referred to as "chirp", in some instances. Suitable grating structures include, for example, triangular, square/rectangular well (shown in FIG. 2), blazed, and sinusoidal grating structures.

Figure 4:
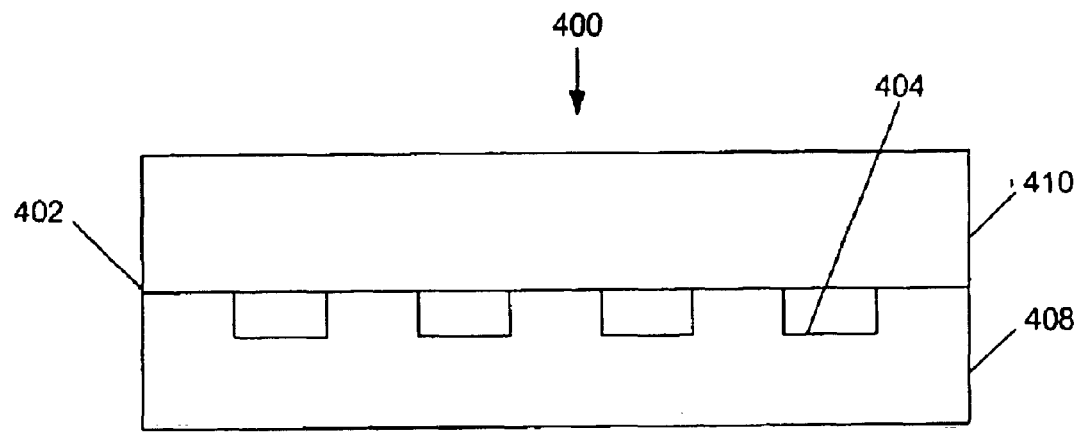
FIG. 4 is a schematic cross-sectional view of a second embodiment of a transmission grating, according to the invention.

Another example of a suitable transmission grating 400 is illustrated in FIG. 4. This transmission grating 400 includes a grating structure 404 disposed internally within a substrate 402. In one embodiment, the substrate 402 includes a first piece 408, containing the grating structure 404 defined by a surface, and a second piece 410. The first and second pieces 408, 410 can be bonded, coupled, or otherwise combined together to form the substrate 402 using a variety of techniques. For example, the first and second pieces 408, 410 can be adhesively coupled using an optical adhesive or the two pieces can be mechanically coupled using a clamp or other fastener to hold the pieces together. These methods can be less satisfactory for some applications because optical adhesives can partially fill the grating and mechanical coupling can be cumbersome and may not maintain the bonding of the two pieces to the desired tolerance. In another bonding method, the two pieces are reactively coupled or crosslinked using reactive groups on the surface of the two pieces that are, optionally, photochemically or thermally activated. Alternatively, the surface of one or both pieces or a coating on the surface(s) can be treated to generate reactive groups that can bond to the other surface. Examples of suitable treatments include acid or plasma treatments. Optionally, the bonding between the pieces can be improved using a high temperature (e.g., about 1000° C. or more) annealing process.

Figure 5:
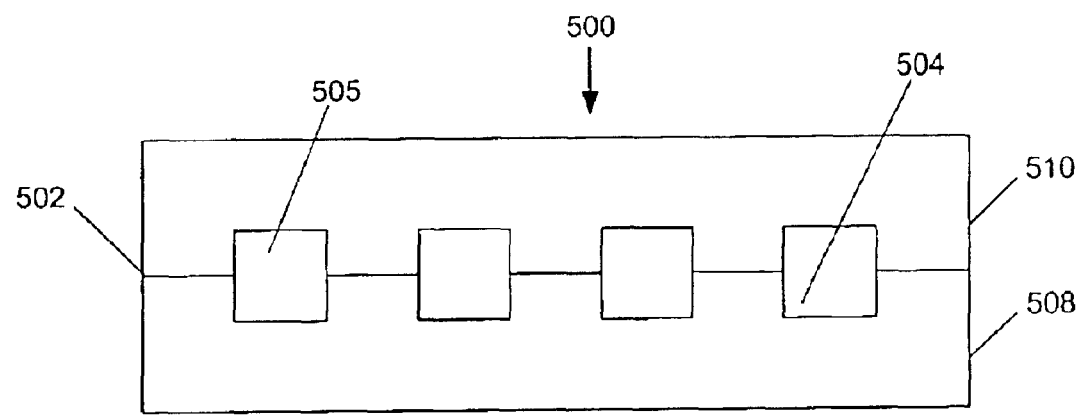
FIG. 5 is a schematic cross-sectional view of a third embodiment of a transmission grating, according to the invention.

In one embodiment, illustrated in FIG. 5, the grating structure 504, 505 is formed in both of the first and second pieces 508, 510 and the two grating structures are aligned to form a single grating structure with a depth greater than either of the two individual grating structures. This is one procedure that can be used to form a grating structure with deep wells or a large aspect ratio.

Figure 8:
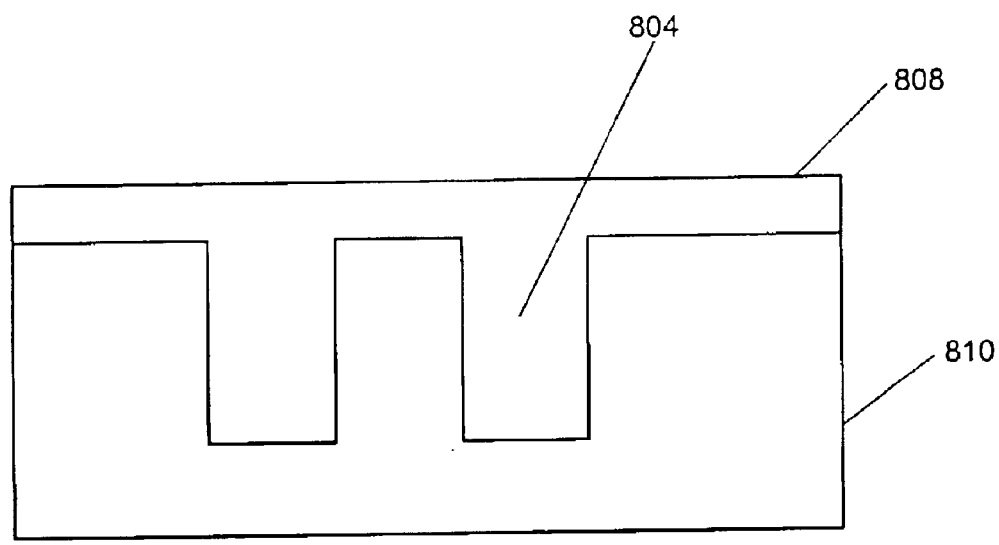
FIG. 8 is a schematic cross-sectional view of a fourth embodiment of a transmission grating, according to the invention.
Figure 9:
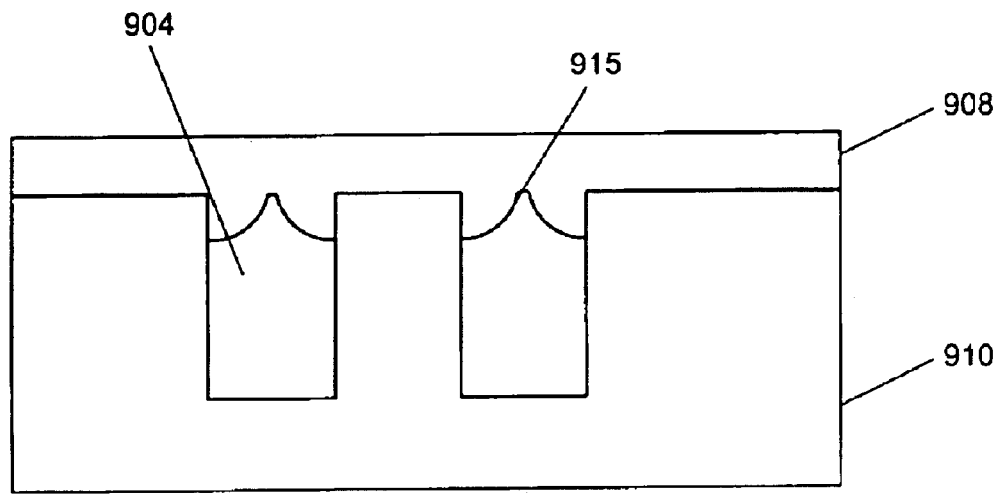
FIG. 9 is a schematic cross-sectional view of a fifth embodiment of a transmission grating, according to the invention.

Other examples of bonded transmission gratings include a second piece 808, 908 formed on a first piece 810, 910 by deposition of material over and, optionally, within the grating structure 804, 904, as illustrated in FIGS. 8 and 9. Suitable deposition techniques include, for example, chemical vapor deposition (CVD) such as plasma enhanced chemical vapor deposition (PECVD) and low pressure chemical vapor deposition (LPCVD), physical vapor deposition such as sputtering and evaporation, spin on deposition of flowable materials (e.g., flowable oxides or oxide precursors), and coating of polymeric materials (e.g., solvated polymers or curable monomer compositions).

Chemical vapor deposition techniques that limit diffusion of the chemical vapor components can, at least in some instances, result in the formation of bridging structures 915, as illustrated in FIG. 9. The bridging structures 915 are formed due to the limitation of diffusion of material into the grating structure 904 because of the narrow openings of the grating structure. This can be advantageous if it is desired to have a substantially open (e.g., unfilled) grating structure.

Figure 10:
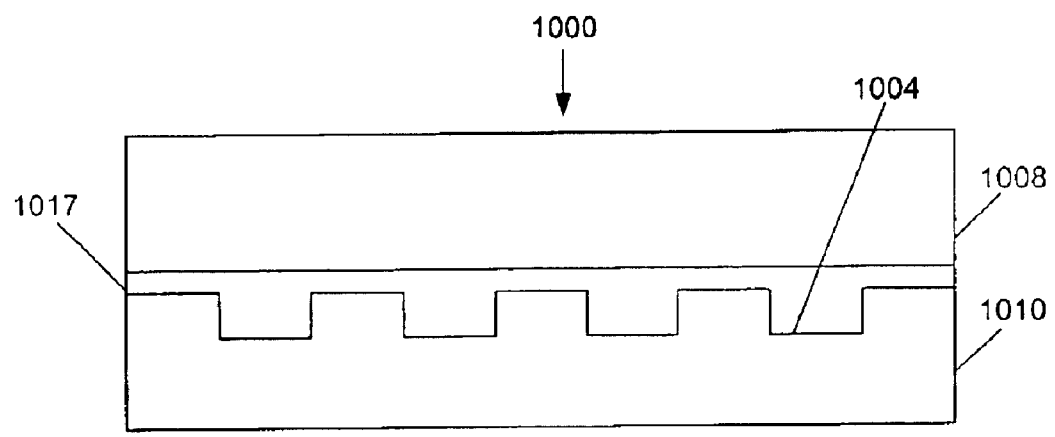
FIG. 10 is a schematic cross-sectional view of a sixth embodiment of a transmission grating, according to the invention.

In another embodiment, the grating structure is filled and then the second piece is bonded, coupled, or otherwise combined together with the first piece. For example, referring to FIGS. 4 and 5, the grating structures 404, 504, 505 can be filled with a solid or liquid material before bonding the first piece 410, 510 to the second piece 408, 508. In yet another embodiment illustrated in FIG. 10, the grating structure 1004 is filled with a solid or liquid material and a layer 1017 of that material is formed on the surface of the first piece 1010. The second piece 1008 is then bonded to the first piece 1010 through the layer 1017. In any of these embodiments, the solid or liquid material has a different index of refraction than the first piece 410, 510, 1010 and, optionally, the second piece 408, 508, 1008. Any solid or liquid material that meets this criterion can be used. Preferably, the solid or liquid material has low or no absorbance of light over the wavelength range that will be diffracted by the grating. For wavelength ranges within 700 to 1600 nm, used in communications applications, suitable materials include, for example, quartz and other silicon oxides, silicon, silicon nitride, silicon oxynitride, and plastics. Not all of these materials are suitable for the entire wavelength range. For example, silicon has substantial absorption below about 1200 nm.

In some embodiments of the grating structures illustrated in FIGS. 4, 5, 8, 9, and 10, the materials used for the first and second pieces of the substrate are the same. In other embodiments, the materials are different. The substrate or pieces used to form the transmission grating are typically formed using a material that can substantially maintain the grating structure for a desired period of time, for example, at least one year or at least ten years. In addition, the material is typically selected to be transparent (e.g., absorbance of no more than 5% and, preferably, no more than 1%) for the wavelengths of light to be diffracted. For wavelength ranges within 700 to 1600 nm, used in communications applications, suitable materials include, for example, quartz and other silicon oxides, silicon, silicon nitride, silicon oxynitride, plastics. Not all of these materials are suitable for the entire wavelength range. For example, silicon has substantial absorption below about 1200 nm.

Figure 11:
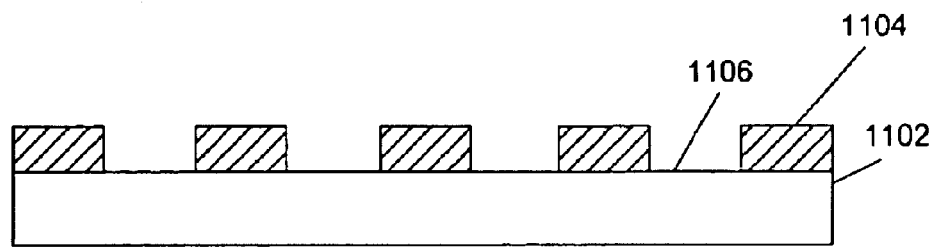
FIG. 11 is a schematic cross-sectional view of a seventh embodiment of a transmission grating, according to the invention.

FIG. 11 illustrates another embodiment of a transmission grating. This transmission grating includes a substrate 1102 formed of a first material and teeth 1104 formed using a second material with wells 1106 between the teeth. For example, the substrate 1102 can be a quartz or silicon substrate and the teeth 1104 can be made from silicon nitride. One method of preparation of this structure includes forming a layer on the substrate and etching the layer to form the teeth 1104 and wells 1106. The substrate 1102 can act as an etch stop.

Figure 12:
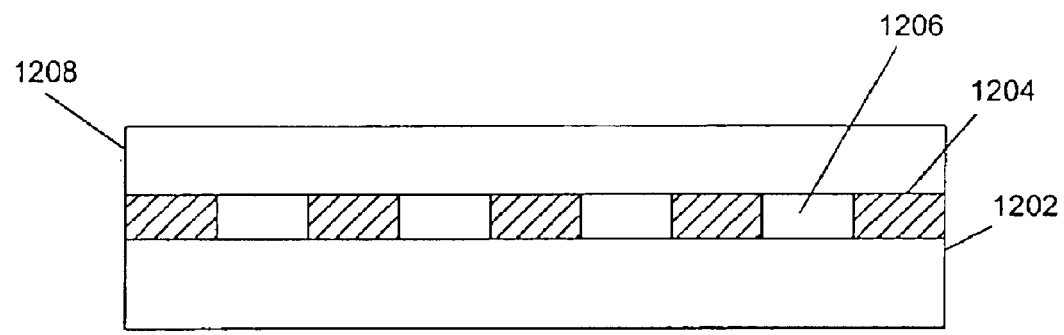
FIG. 12 is a schematic cross-sectional view of an eighth embodiment of a transmission grating, according to the invention.

FIG. 12 illustrates yet another embodiment of a transmission grating. In this embodiment, a first piece includes a substrate 1202 formed of a first material and teeth 1204 formed of a second material with wells 1206 between the teeth. A second piece 1208 is bonded to the teeth 1204 as discussed above. The first piece can be formed as discussed with respect to the embodiment of FIG. 11.

One consideration when forming the structure illustrated in FIG. 5 is the registration of the two grating structures 504, 505. Generally, there are three degrees of freedom when registering the two grating structures: the relative horizontal and vertical positions of the grating structures and the angle at which one of the structures is rotated relative to the other structure. It will be recognized that registration methods may not provide exact alignment of the grating structures because of factors such as, for example, imperfections in the grating period and non-smooth surfaces. The registration techniques described herein can provide, in many instances, improved alignment of the grating structures over conventional techniques.

One example of a suitable registration method includes observing the interference pattern using a microscope or other device and a light source to accurately align the two grating structures. This can be done by observing one, two, and, preferably, three or more positions on the grating structures. Preferably, at least three non-colinear points are observed. In one embodiment, the two pieces 508, 510 are individually positioned on transparent plates (e.g., glass or plastic plates) that are held slightly apart. This allows at least one of the plates to be moved in the horizontal and vertical directions and rotated by an angle to provide alignment. The interference pattern between the grating structures 504, 505 is observed using one or more microscopes positioned over one or more points on the grating structures until registration is achieved and then pressure is applied to the plates to bring the pieces 508, 510 into contact. The two pieces 508, 510 are then bonded together, as described above.

In another registration method, one or more complementary structures are formed on the surfaces of the pieces 508, 510 that also define the grating structures 504, 505. For example, a triangular, square, rectangular, or hemispheroidal projection can be formed extending from the surface of one piece (e.g., piece 508) and a complementary triangular, square, rectangular, or hemispheroidal indentation formed in the surface of the other piece (e.g., piece 510). These complementary structures can be engaged to provide registration. Preferably, two or more complementary structures are used. In addition, the complementary structures are preferably formed during the formation of the grating structures 504, 505. Otherwise, the formation of the complementary structures should include a registration procedure with the grating structures 504, 505. These projections and indentations are preferably formed outside the region in which the grating structures are formed. The projections and indentations are preferably formed near the grating structure.

Returning to FIG. 4, the two pieces 408, 410 can have the same or different thickness. Thickness is typically selected based on factors such as, for example, the application for which the grating is to be used, the materials of the grating, the depth of the grating structure, and the mechanical support needed to avoid or reduce damage to the grating structure.

Figure 13:
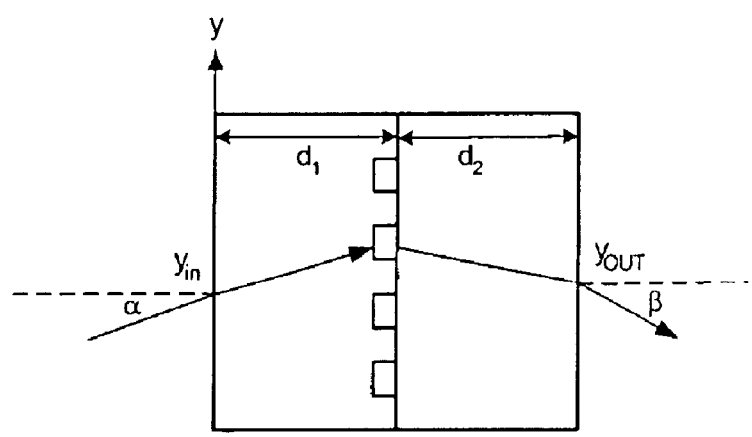
FIG. 13 is a schematic cross-sectional view of a ninth embodiment of a transmission grating, according to the invention, showing various parameters of the grating.

In one embodiment, the two pieces of the transmission grating substrate are made of the same material and have the same thickness. If the light is incident on the surface of the grating at the Bragg angle (i.e., where $|\alpha|=|\beta|$), the position at which the light exits the transmission grating 400 will be substantially temperature independent. Generally, using the typical diffraction model and equations, the first order diffraction light beam exits the grating at a position $y_{out}$ according to the following equation and illustrated in FIG. 13:

$$y_{out} = y_{in} - \left[ d_2 \frac{\frac{n_0}{n(T)}\sin(|\beta|)}{\sqrt{1 - \left[\frac{n_0}{n(T)}\sin(|\beta|)\right]^2}} - d_1 \frac{\frac{n_0}{n(T)}\sin(|\alpha|)}{\sqrt{1 - \left[\frac{n_0}{n(T)}\sin(|\alpha|)\right]^2}} \right]$$

where $Y_{in}$ is the position along the grating at which the light is input, n(T) is the temperature dependent index of refraction for the material used to form the pieces of the grating, $n_0$ is the index of refraction of the material in which the grating is placed (e.g., air), and $d_1$ and $d_2$ are the thicknesses of the first and second pieces, respectively. When $d_1=d_2$ and $|\alpha|=|\beta|$, the output position $y_{out}$ is substantially temperature independent.

One advantage of the transmission gratings of FIGS. 4, 5, 8, 9, 10, and 12 is that the grating structure is within the substrate. This facilitates keeping foreign material out of the grating and reducing degradation of the grating due to exposure to outside elements. The internal transmission grating structures also exhibit higher grating efficiency than open transmission grating structures, as can be demonstrated by numerical solution of Maxwell's equations. In addition, it is possible to coat both outer surfaces of the transmission grating with an antireflection coating to reduce losses due to reflection.

The transmission grating can also have one or more advantages over other wavelength dispersing components. For example, the transmission grating does not require a reflective layer (e.g., a reflective metal layer) disposed over the grated substrate as used in typical reflective gratings. This can reduce the number of manufacturing steps and can reduce the number of material-related errors that can arise, such as, for example, imperfections in the reflective layer. In addition, there can be a geometrical advantage, because the transmission gratings do not block each other and they can introduce more degrees of freedom in a device design, as opposed to most optical elements that are typically used on-axis.

Figure 7:
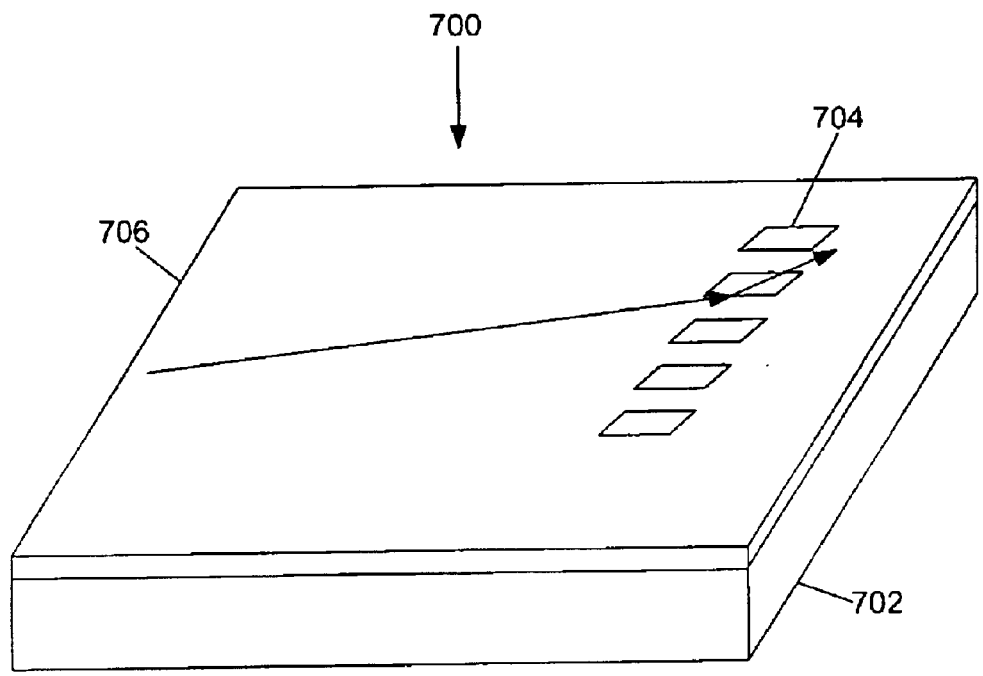
FIG. 7 is a schematic cross-sectional view of an integrated optical structure containing a transmission grating, according to the invention.

In the preceding description and Figures, the grating (whether a reflective or transmission grating) has been illustrated as an individual optical component. Alternatively, the grating can be formed on a substrate, as illustrated in FIG. 7. As an example, the optical structure 700 illustrated in FIG. 7 includes a substrate 702 having formed therein a grating 704 and a waveguiding layer 706 that carries light to and, optionally, from the grating. A top layer (not shown) is typically formed over the wave guiding layer. Other configurations of optical elements on a substrate can be formed.

The structural parameters of the grating structure can be selected to obtain the desired diffraction properties. These parameters include, for example, the grating period (for example, the average center-to-center distance between two teeth or wells, which can be described as the number of grating lines per mm), the grating depth, the aspect ratio (for example, the well width divided by depth of the grating), the duty cycle (for example, the tooth width divided by grating period, in FIG. 2, the duty cycle is 50%), the angle of blazing for blazed gratings, and the grating chirp (grating period variation, whether intended or not).

In some embodiments, the parameters of the grating are selected to result in at least 50%, 75%, or 90% or more of the light being diffracted into a single diffraction order. Typically, this diffraction order is not the zero order, because zero order diffraction results in no wavelength dispersion. The diffraction of light into a single diffraction order or a small number of diffraction orders can be facilitated by a numerical optimization procedure with a piece of software (e.g., Gsolver™ available from Grating Solver Development Company, Allen, Tex.). Preferably, the grating parameters are selected so that the diffraction efficiency for the chosen order is high and substantially equal across the entire desired bandwidth of the grating. Factors that can influence the selection of grating parameters include, for example, high diffraction efficiency for a particular wavelength range, angle of incidence, and polarization; desired grating and device geometry; materials used for the grating; and manufacturability of the grating. Methods for selecting the structural parameters to obtain the desired amount of diffraction into a desired diffraction order are known in the art. Examples and optimization of transmission gratings are also known.

Figure 3:
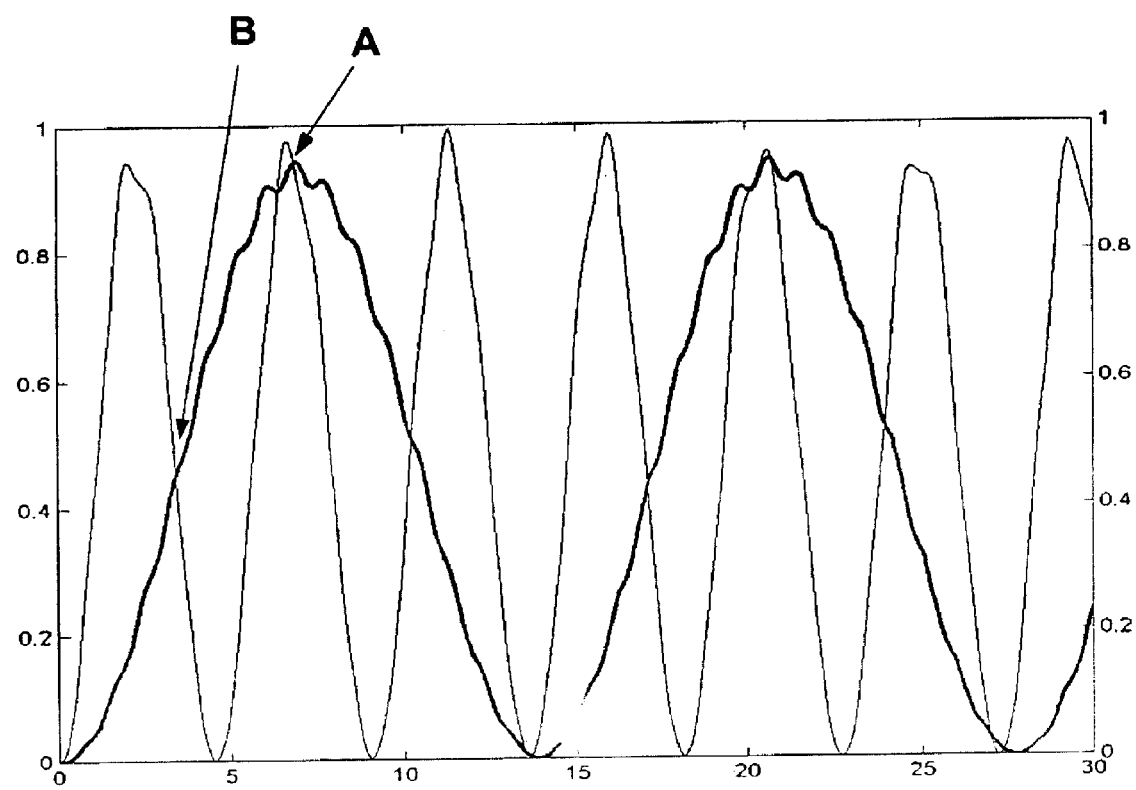
FIG. 3 is a graph of calculated diffraction efficiency (percentage, left y-axis for TE polarization, right y-axis for TM polarization) versus grating depth (x-axis, μm) for TE (light line) and TM (dark line) polarizations of light for a quartz transmission grating, according to the invention.

In addition, in some embodiments, the structural parameters are selected so that the difference in the percentage of light being diffracted into a desired diffraction order for the TM and TE polarizations of light is no more than 10%, 5%, or even 2%. In some embodiments, the grating structure is formed to have at least 85%, 90%, 95%, or even 99% diffraction efficiency for both TM and TE polarizations. FIG. 3 illustrates a schematic graph of diffraction efficiency versus grating depth for TM and TE polarizations of light using a quartz transmission grating. As illustrated in the graph, to obtain the highest, substantially uniform diffraction efficiency for both polarizations (point A of FIG. 3) requires a substantially deep grating. Substantially uniform grating efficiency for both polarizations can also be obtained for lower levels of overall grating efficiency (point B of FIG. 3) utilizing a shallower grating. The deep grating typically results in grating structures with relatively large aspect ratios. For example, for optical communications applications, the width of a well in a square/rectangular well grating is typically about 300 to 1000 nm. The depth of the well can be in the range of 1.5 to 10 $\mu$m giving an aspect ratio (depth:well width) of 3:1, 5:1, 7:1, 10:1, 12:1, 15:1 or more to obtain high diffraction efficiency for both TM and TE polarizations.

Another method for obtaining substantially uniform diffraction efficiency for both TE and TM polarizations, if desired, includes splitting the TE and TM polarizations into individual light beams, turning the polarization of one beam by 90 degrees, and then using a grating having the desired diffraction efficiency for only one polarization. In another method, the TE and TM polarizations are split into two beams. One beam is sent to a first grating that has high diffraction efficiency for that polarization and the second beam is directed to a second grating that has high diffraction efficiency for the other polarization. These two beams are then recombined (e.g., focused at a single position).

The grating structure can be formed by a variety of techniques. One technique includes mechanical ruling using a stylus or other ruling device having a hard tip, such as diamond or silicon carbide. Other techniques include the use of photolithographic methods, including mask-based photolithography; lithographic methods using a holographic mask, e.g., near-field holography; and direct holographic exposure to form a grating pattern in a photoresist material deposited on the substrate. The substrate can then be etched according to the grating pattern using any wet or dry etching techniques to form the grating. Appropriate wet and dry etching techniques and etchants typically depend on the material used for the substrate.

High aspect ratio grating structures can be formed by aligning grating structures formed in two different pieces of a substrate, as illustrated in FIG. 5. Alternatively, the high aspect ratio grating structures can be formed in a single substrate. A new method of preparing a high aspect ratio grating is schematically illustrated in FIGS. 6A to 6G. In this method, a suitable substrate 100 is selected. The substrate can be a single material or one or more layers disposed on a base layer. The substrate 100 includes the material in which the grating structure will be formed. Generally, this material is selected to be substantially transparent in the wavelength range of light that is to be diffracted using the grating structure. Preferably, the material has little absorption (e.g., no more than 5% or 10%) in that wavelength range. For many communications applications, which utilize light having wavelengths in the range of about 1200 to 1600 nm, suitable materials from which the grating structure can be formed include, for example, quartz, silica ($SiO_x$), silicon, silicon nitride, silicon oxynitride ($SiO_xN_y$), and glass (including alkali glasses). The optional base layer can be made using any material including, for example, quartz, silica, silicon, and glass (including alkali glasses).

Typically, a masking layer 102 is disposed on the substrate 100. The masking layer 102 will be patterned, as described below, and used to protect regions of the substrate from etching in subsequent process steps. Generally, the masking layer can be formed using any material that is sufficiently resistant to the etchant used to form the grating structure so that the substrate 100 below the patterned masking layer is not substantially etched. Suitable materials for the masking layer 102 include, for example, metals, such as chromium, aluminum, and nickel; alloys or metal mixtures, such as nickel/chromium; silicides, such as titanium silicide; silicon nitride; silicon carbide; diamond; and silicon. The masking layer can be formed using any suitable layer formation techniques including, for example, chemical vapor deposition, physical vapor deposition such as sputtering and evaporation, sublimation, reactive conversion of a layer into another material (e.g., silicide formation), and coating.

The thickness of the masking layer 102 can depend on factors such as, for example, the resistance of the material to the etchant used to form the grating structure, the technique used to form the masking layer, and the desired depth of the grating structure. Examples of suitable thicknesses for the masking layer are in the range of 100 nm to 1000 nm.

Figure 6A:
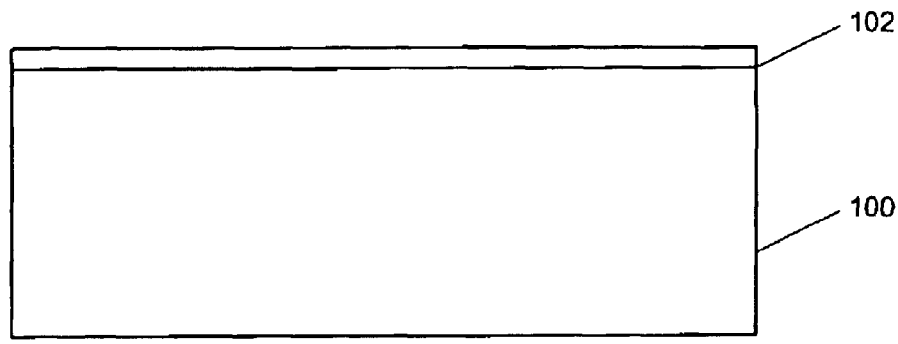
FIGS. 6A to 6G are schematic cross-sectional views illustrating steps in one embodiment of a method of forming a grating structure, according to the invention.
Figure 6B:
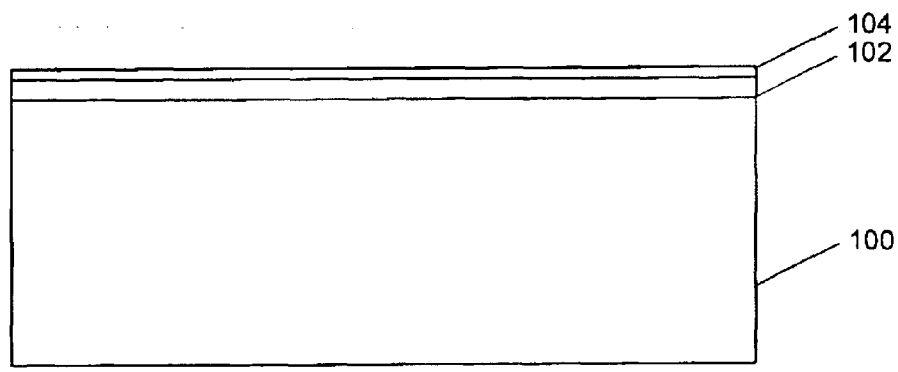

After formation of the masking layer 102, a photoresist layer 104 is formed over the masking layer 102, as illustrated in FIG. 6B. Any photoresist material can be used for the photoresist layer, including any negative or positive photoresist materials. In some alternative embodiments, the photoresist material and its thickness are selected such that the photoresist layer can also be used as the masking layer 102 (i.e., the photoresist material sufficiently resists the etchant used to form the grating structure). In such embodiments, a separate masking layer is not needed.

Figure 6C:
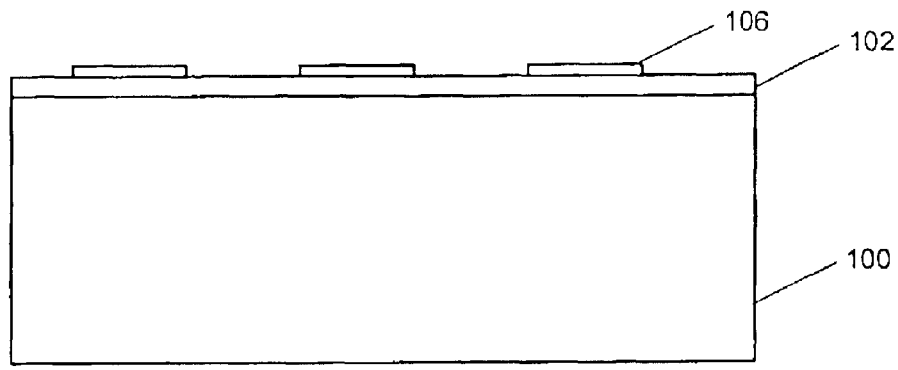

The photoresist layer is developed by selective exposure to light to form a patterned photoresist layer 106, as illustrated in FIG. 6C. Any photolithographic technique can be used, including, the formation of a pattern in the photoresist layer 104 by exposure of the photoresist layer to light through a mask or by a holographic exposure created by interference between light beams split from a coherent light source. In preferred embodiments, the holographic exposure is performed without a mask and is generated by constructive and destructive interference of light from the two light beams. This can facilitate the formation of a grating pattern, including grating patterns having a period of 2 to 3 $\mu$m or less.

Following formation of the pattern in the photoresist layer 104, the photoresist layer is etched to form a patterned photoresist layer 106 as illustrated in FIG. 6C. Any wet or dry etching technique can be used. In some instances, wet etching techniques are less preferred for any of the etching steps described herein because residue from the wet components may be left behind or absorbed by the substrate. This residue can later contaminate the grating structure as the residue diffuses, evaporates, or otherwise leaves the substrate.

Figure 6D:
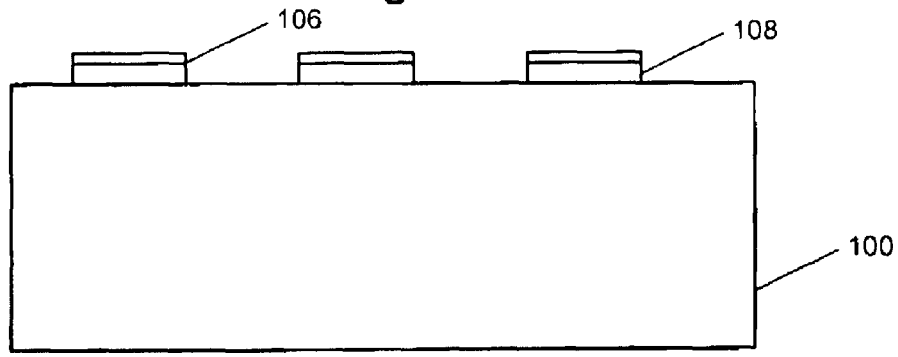
Figure 6E:
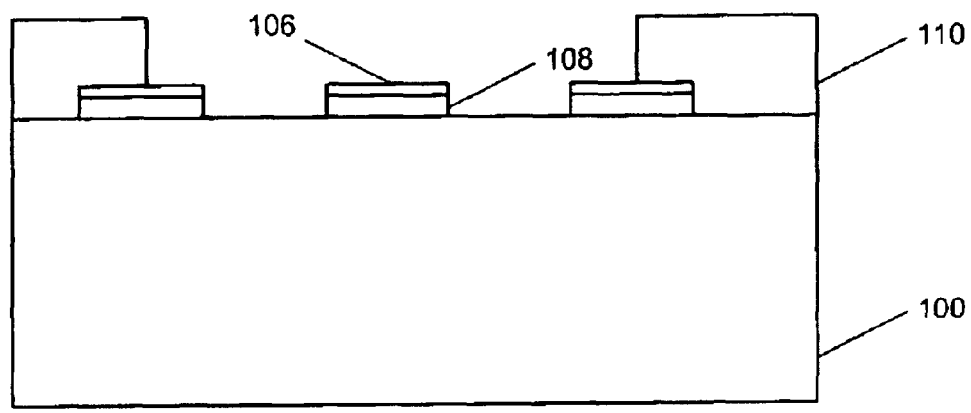

The masking layer 102 is also etched to form a patterned masking layer 108, as illustrated in FIG. 6D. This etching can occur simultaneous to or subsequent to the etching of the photoresist layer 104 to form the patterned photoresist layer 106. In some instances, because the masking layer is formed of a harder or substantially different material, the photoresist layer and masking layer are separately etched. Any wet or dry etching technique can be used. One particularly suitable etching technique is reactive ion etching (RIE). The etching technique and etchant are typically selected so that the substrate 100 is not substantially etched. Thus, the substrate 100 acts as an etch stop.

In an alternative method, the masking layer is formed on a previously patterned photoresist layer. The patterned portion of the photoresist layer is then dissolved in a solvent solution. This lifts off the portion of the masking layer to expose the substrate according to the pattern.

Returning to FIGS. 6A to 6G, after forming the patterned photoresist and masking layers 106, 108, an optional grating envelope pattern 110 is formed using a photoresist material (and, optionally, a masking material), as illustrated in FIG. 6E. This grating envelope pattern 110 is typically formed using any photolithographic technique, including methods substantially similar to those discussed above for the formation of the patterned photoresist layer 106. The grating envelope pattern surrounds the region of the substrate in which the grating structure is to be formed so that there is no stray etching in other regions. This is particularly useful when the grating pattern is formed holographically without a mask. Alternatively, the patterned photoresist layer 106, and patterned masking layer 108 can be formed and patterned in a manner (e.g., using a mask) that generates a grating envelope without the additional processing steps.

Figure 6F:
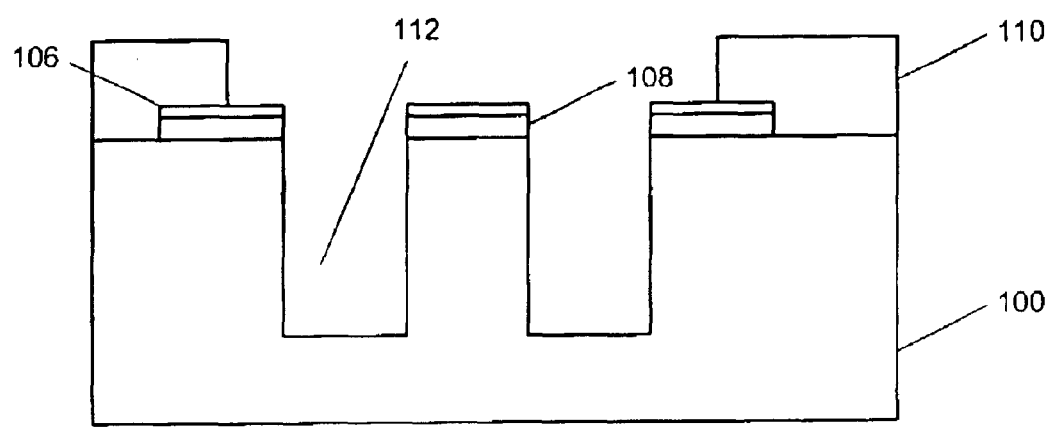

The substrate 100 is then etched to form the grating structure 112, as illustrated in FIG. 6F. The grating structure 112 has wells formed into the substrate 100 with an aspect ratio (depth:width) of at least 3:1. Typically, the well width is no more than 1 $\mu$m. The aspect ratio can be 5:1, 10:1, 12:1, 15:1 or greater. This typically requires the use of specialized etching techniques, such as, for example, deep reactive ion etching (DRIE) using, for example, high density plasma etching equipment. Examples of suitable devices for this technique include the ICP 380 Plasmalab system from Oxford Instruments, U.K. or the Omega™ 201-1-M0RI from Trikon Technologies, U.K. The etching can be performed as a timed etch to obtain a desired grating depth. Alternatively, an etch stop, such as a buried layer of silicon or another material, can be provided to indicate that the desired grating depth has been achieved. A silicon etch stop could be converted into silicon dioxide subsequently by oxidation.

Figure 6G:
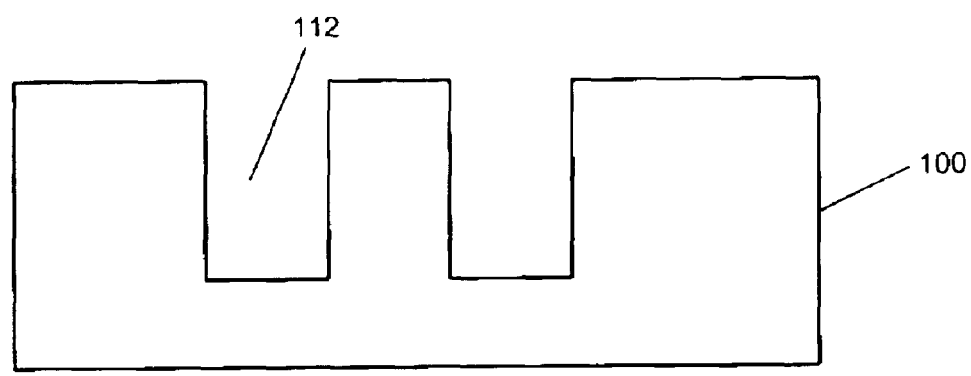

After forming the grating structure 112, the patterned masking layer 108, the patterned photoresist layer 106, and the optional grating envelope pattern 110 are removed, as illustrated in FIG. 6G. The removal of these layers can be performed using, for example, wet or dry etching techniques selective to the base material.

After formation of the grating structure 112, the second piece of the transmission grating can be coupled to the first piece containing the grating structure, as described above. As an option, after formation of the grating structure, the grating structure can be filled with a dielectric material different from the substrate. Examples of suitable materials include silica, silicon, silicon nitride, silicon oxynitride, and plastics. Such materials can be deposited by a variety of techniques, including, for example, spin coating techniques, physical vapor deposition such as sputtering and evaporation, and PECVD, LPCVD, or other chemical vapor deposition techniques, as described above. In some instances, only a portion of the grating structure is filled, as illustrated in FIG. 9.

After filling the grating structure, the filling material, which typically extends at least several micrometers above the top surface of the substrate can be planarized to give a substantially smooth surface for coupling to the other piece of the transmission grating. This planarized surface can be above the surface of the substrate or the planarization can be performed to expose the surface of the substrate so that the filling material is substantially provided only within the grating structure. The planarization can be accomplished using, for example, chemical, mechanical, or chemical/mechanical polishing processes.

By way of example, a grating structure can be formed in quartz with a period of 1035 nm and a duty cycle of 51%. Each grating line has a depth of 6.7 nm, a well width of about 500 nm, and a length of 1 to 10 mm. The grating structure is bonded to a second quartz piece. The calculated first order diffraction efficiency for TE polarization is 97.8% and for TM polarization is 96.6%, as calculated by Gsolver™ 4.1 for a wavelength of 1550 nm and 32.degree angle of incidence.

As another example, a grating structure can be formed on a quartz base material using silicon nitride (refractive index of 2.0) for the grating structure with a period of 1042 nm and a duty cycle of 51%. Each grating line has a depth of 2.0 $\mu$m, a well width of about 500 nm, and a length of 1 to 10 mm. The grating structure is bonded to a second quartz piece. The calculated first order diffraction efficiency for TE polarization is 89% and for TM polarization is 98%, as calculated by Gsolver™ 4.1 for a wavelength of 1550 nm and 32° angle of incidence.

As an alternative to making an isolated transmission grating, a transmission grating structure can be formed in a waveguiding layer, as described above. In one example, the waveguiding layer has single mode confinement in the vertical direction (by selecting the thickness of the waveguiding layer) and no confinement in the horizontal direction. This waveguiding layer is formed on any substrate to provide structural support. A suitable waveguiding layer for optical communications, as described above, is silicon oxynitride. Other possible waveguiding materials include, for example, silicon dioxide, silicon nitride, silicon, and plastics.

The grating structure is formed as a series of cuts through the waveguide films. In this embodiment, the horizontal length, as opposed to the depth, corresponds to the dimension illustrated as the x-axis of FIG. 3. Thus, a grating structure can be formed, as described above with a period of 1035 nm and a duty cycle of 51%. Each grating line has a horizontal depth of 6.7 $\mu$m, a well width of about 500 nm, and a vertical length of 5 $\mu$m. The grating structure is optionally filled with another material, such as a polymer, silicon oxide, or silicon nitride. Otherwise, the grating structure is filled with air or another gas.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A transmission grating, comprising:
a first piece comprising a first free surface defining a grating structure; and a second piece having a second free surface fusion bonded to, and in contact with, the first free surface of the first piece to encapsulate the grating structure.

2. The transmission grating of claim 1, wherein the second free surface further defines the grating structure, wherein the first free surface of the first piece is bonded to the second free surface of the second piece to form the grating structure.

3. The transmission grating of claim 2, wherein the grating structure defined by the first and second pieces includes wells, the wells in the second piece being aligned with the wells in the first piece.

4. The transmission grating of claim 1, wherein the grating structure has an aspect ratio of at least 5:1.

5. The transmission grating of claim 1, wherein the grating structure has an aspect ratio of at least 10:1.

6. The transmission grating of claim 1, wherein the first and second pieces are formed of the same material.

7. The transmission grating of claim 1, wherein the grating structure has a depth such that first order diffraction efficiencies of the transmission grating for TE and TM polarized light are within 10% of each other.

8. The transmission grating of claim 1, wherein the grating structure has a depth such that first order diffraction efficiencies of the transmission grating for TE and TM polarized light are within 5% of each other.

9. The transmission grating of claim 1, wherein the second piece comprises a material that partially fills the grating structure.

10. The transmission grating of claim 1, wherein the first piece is detachably bonded to the second piece.

11. The transmission grating of claim 1, wherein the first free surface defines a grating comprised of a plurality of wells, the second piece being fusion bonded to contact portions of the first free surface between the wells.

12. A transmission grating, comprising:
a first piece, formed from one of an oxide and a nitride of silicon, comprising a surface defining a grating structure, the grating structure comprising a plurality of etched wells, the wells having an average aspect ratio of at least 7:1.

13. The transmission grating of claim 12, further comprising a second piece bonded to the surface of the first piece to encapsulate the grating structure.

14. The transmission grating of claim 12, wherein the wells have an average aspect ratio of at least 10:1.

15. The transmission grating of claim 12, wherein individual diffraction efficiencies for TE and TM polarized light are at least 85% for at least one operational wavelength of the transmission grating.

16. The transmission grating of claim 12, wherein individual diffraction efficiencies for TE and TM polarized light are at least 95% for at least one operational wavelength of the transmission grating.

17. The transmission grating of claim 12, wherein individual diffraction efficiencies for TE and TM polarized light differ by no more than 5% for at least one operation wavelength of the transmission grating.

18. A transmission orating comprising a first piece comprising a surface on a substrate defining a orating structure;
wherein individual diffraction efficiencies for TE and TM polarized light incident on the orating structure are at least 90% for at least one operational wavelength of the transmission grating; and
wherein the grating structure comprises a plurality of wells etched into the substrate, the wells having an average aspect ratio of at least 7:1.

19. The transmission grating of claim 18, further comprising a second piece bonded to the surface of the first piece to encapsulate the grating structure.

* * * * *